United States Patent Office 3,014,946
Patented Dec. 26, 1961

3,014,946
PHOSPHINYL DIESTERS OF AROMATIC PHOSPHITES
Gail H. Birum, Dayton, Ohio, assignor to Monsanto Chemical Company, St. Louis, Mo., a corporation of Delaware
No Drawing. Filed July 5, 1960, Ser. No. 40,550
12 Claims. (Cl. 260—461)

The present invention relates to organic compounds of phosphorus and more particularly provides a new and valuable class of benzenoid compounds having three phosphorus-containing functional groups and the method of preparing the same.

According to the invention, certain phosphinyl diesters of aromatic phosphites or phosphorothioites are prepared by the reaction of substantially one mole of a dichloro phosphorus compound which is an aromatic phosphorodichloridite or phosphorodichloridothioite with substantially two moles of a hydrocarbon carboxaldehyde and substantially two moles of a triorgano phosphorus ester according to the scheme:

$$Ar-X-PCl_2 + 2RCHO + 2R'P(OY)_2 \longrightarrow$$

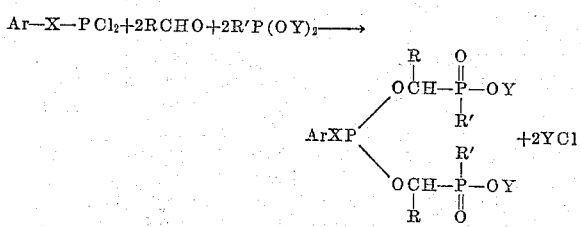

wherein Ar is selected from the class consisting of hydrocarbon and halogen-substituted hydrocarbon radicals which contain an aromatic ring, are free of aliphatic unsaturation and have from 6 to 12 carbon atoms, X is selected from the class consisting of oxygen and sulfur, R is selected from the class consisting of hydrogen and hydrocarbon radicals which are free of aliphatic unsaturation and which contain from 1 to 11 carbon atoms, Y is selected from the class consisting of alkyl and haloalkyl radicals of from 1 to 12 carbon atoms, and R' is selected from the class consisting of —OY and hydrocarbon which are free of aliphatic unsaturation and contain from 1 to 12 carbon atoms.

One class of dichloro phosphorus compounds which are particularly suited for the present purpose are the hydrocarbyl phosphorodichloridites, i.e., compounds of the formula Ar—O—PCl₂ where Ar is as above defined. Examples of such phosphorodichloridites are phenyl, α-, or β-naphthyl, 4-biphenylyl, o-, m- or p-tolyl, p-ethylphenyl, dibutylphenyl, mesityl, cumyl, p-cyclohexylphenyl, o-, m-, or p-pentylphenyl, benzyl, 2-phenylethyl, 4-isopropylbenzyl, 1-acenaphthenyl, or α-naphthylmethyl phosphorodichloridite.

The corresponding phosphorodichloridothioites, i.e, compounds of the formula Ar—S—PCl₂ where Ar is as above defined, are similarly valuable for the present purposes. Such compounds are, for example, phenyl phosphorodichloridothioite, β-ethyl-α-naphthyl phosphorodichloridothioite, 4-cyclopentylphenyl phosphorochloridothioite, benzyl phosphorodichloridothioite, 5-acenaphthenyl phosphorodichloridothioite, 4-biphenylyl phosphorodichloridothioite, etc.

The above hydrocarbyl phosphorodichloridites or phosphorodichloridothioites may contain one or more halogen substituents in either the aromatic ring thereof, at an aliphatic residue which is attached to the aromatic ring, or at both the aromatic ring and said aliphatic residue. Examples of such halogen-substituted compounds are 2-, 3- or 4-chlorophenyl phosphorodichloridite or phosphorodichloridothioite; 3,4,5- or 2,3,4-trichlorophenyl phosphorodichloridite or phosphorodichloridothioite; pentachlorophenyl phosphorodichloridite or phosphorodichloridothioite; 4-(2-chlorocyclopentyl)phenyl phosphorodichloridite or phosphorodichloridothioite; β-bromo-α-naphthyl phosphorodichloridite or phosphorodichloridothioite; 5-(1,2-dibromoacenaphthenyl) phosphorodichloridite or phosphorodichloridothioite, 4-(trifluoromethyl)-phenyl phosphorodichloridite or phosphorodichloridothioite; p-chlorobenzyl phosphorodichloridite or phosphorodichloridothioite; 4-(iodophenyl)phenyl phosphorodichloridite or phosphorodichloridothioite; octachlorobiphenylyl phosphorodichloridite or phosphorodichloridothioite.

The presently useful aldehydes are formaldehyde and the hydrocarbon aldehydes which are free of aliphatic unsaturation and contain from 1 to 12 carbon atoms. They include, in addition to formaldehyde, the alkanecarboxaldehydes such as acetaldehyde, propionaldehyde, n-butyraldehyde, isobutyraldehyde, valeraldehyde, isovaleraldehyde, n-hexaldehyde, n-heptaldehyde, 2-ethylhexaldehyde, n-octaldehyde, branched-chain nonanal derived by the "Oxo" process, either n-decanal or branched-chain decanal derived by the "Oxo" process, n-undecanal, and lauraldehyde; the benzenoid aldehydes such as benaldehyde, o-, m- or p-tolualdehyde, phenylacetaldehyde, 2-phenylpropionaldehyde, 4 - ethylphenylacetaldehyde, n-hexylbenzaldehyde, biphenylcarboxaldehyde, and α- or β-naphthaldehyde; and the cycloparaffinic aldehydes, such as cyclohexanecarboxaldehyde or 2-methylcyclopentanecarboxaldehyde, etc.

Triorgano phosphorus esters useful for the present purpose are either phosphites or phosphonites. Examples of the former are the simple trialkyl phosphites, such as trimethyl, triethyl, triisopropyl, tri-n-butyl, triamyl, tris (2-ethylhexyl), tridecyl, or tridodecyl phosphite; the mixed trialkyl phosphites such as dimethyl ethyl, diamyl propyl, ethyl methyl propyl, or dodecyl dimethyl phosphite; the simple haloalkyl phosphites, such as tris(2-chloroethyl), tris(2-chloropropyl), tris(3-bromopropyl), tris(dichlorooctyl) and tris(2-bromo-3-chloropropyl) phosphite; the mixed haloalkyl phosphites, such as 2-chloroethyl bis(3-bromopropyl) phosphite or 2-chloroethyl 4-bromobutyl 2-chloropropyl phosphite; and mixed phosphites of both paraffinic and haloparaffinic alcohols such as bis(2-chloroethyl) methyl phosphite or 2-chloropropyl diethyl phosphite. Examples of presently useful phosphonites are the dialkyl hydrocarbylphosphonites such as diethyl, dipropyl, di-tert-butyl, dipentyl, dihexyl, diheptyl, bis(2-ethylhexyl), di-tert-nonyl, or didodecyl phenylphosphonite or β-naphthylphosphonite, or butylphosphonite, or dodecylphosphonite, or cyclohexylphosphonite; the haloalkyl hydrocarbylphosphonites such as bis(2-chloroethyl), bis(2,3-dibromopropyl), bis(tetrafluorobutyl), chlorooctyl ethyl, iodododecyl propyl, bis(hexachlorodecyl) or bis(3-chloro-2-bromopropyl) methylphosphonite or 2-ethylhexylphosphonite, or 4-biphenylphosphonite, or 2-methyclopentylphosphonite, or 1-acenaphthenylphosphonite, or phenylphosphonite.

Products provided according to the invention by reaction of an aryl phosphorodichloridite with a hydrocarboncarboxaldehyde and a trialkyl phosphite are bis[(dialkoxyphosphinyl)hydrocarbyl] aryl phosphites, i.e., compounds of the formula

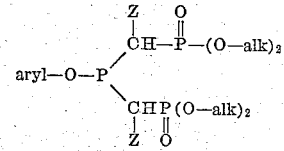

in which aryl denotes a hydrocarbon radical which contains an aromatic ring, is free of aliphatic unsaturation, and has from 1 to 12 carbon atoms, Z is a hydrocarbon radical which is free of aliphatic unsaturation and which contains from 1 to 12 carbon atoms and alk denotes an alkyl radical of from 1 to 12 carbon atoms.

When employing as the dichloro phosphorus component an aryl phosphorodichloridite and using as the aldehyde an alkanecarboxaldehyde, the products which are obtained with the trialkyl phosphites are bis[(dialkoxyphosphinyl)alkyl] aryl phosphites, i.e., they have the structure

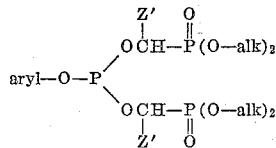

wherein aryl anl alk are as above defined and Z denotes an alkyl radical of from 1 to 11 carbon atoms. An example thereof is bis[1-(diethoxyphosphinyl)ethyl] phenyl phosphite which is prepared from phenyl phosphorodichloridite, acetaldehyde and triethyl phosphite. Variation of acetaldehyde to another alkanecarboxaldehyde and of triethyl phosphite to another trialkyl phosphite or to a tris(haloalkyl) phosphite gives, for example, bis[1-(diethoxyphosphinyl)propyl] phenyl phosphite;
bis[1-(dibutoxyphosphinyl)hexyl] phenyl phosphite;
bis[1-(methoxyethoxyphosphinyl)butyl] phenyl phosphite;
bis[1-(2-chloroethoxymethoxyphosphinyl)dodecyl] phenyl phosphite;
bis[1-(didodecylphosphinyl)propyl] phenyl phosphite;
bis{1-[bis(2-ethylhexyloxy)phosphinyl]ethyl} phenyl phosphite;
bis[1-(diethoxyphosphinyl)-2-ethylhexyl] phenyl phosphite, etc.

When the dichloro phosphorus compound is an aryl phosphorodichloridite, the aldehyde is an aromatic aldehyde and the phosphite is a trialkyl phosphite, the products are bis[1-(dialkoxyphosphinyl)aralkyl] aryl phosphites. Examples of compounds thus provided are bis[α-(diethoxyphosphinyl)benzyl] phenyl phosphite, which is prepared from phenyl phosphorodichloridite, benzaldehyde and triethyl phosphite; bis[α-(dibutoxyphosphinylbenzyl] α-naphthyl phosphite; bis[1-(diisopropoxyphosphinyl)-2-phenylethyl] phenyl phosphite; bis{α-[bis(2-ethylhexyloxy)phosphinyl]-p-ethylbenzyl} benzyl phosphite; and bis[1-(dimethoxyphosphinyl)-3-phenylpropyl] p-tolyl phosphite.

When the phosphite is a haloalkyl phosphite, the products obtained from an aryl phosphorodichloridite and an aromatic aldehyde are bis{1-[bis(haloalkoxyphosphinyl)]aralkyl} aryl phosphites, e.g., bis{1-[bis(2-chloroethoxy)phosphinyl]benzyl} phenyl phosphite which is prepared according to the invention from phenyl phosphorodichloridite, benzaldehyde and tris(2-chloroethyl) phosphite.

As stated above, the aromatic dichloro phosphorus compounds may have one or more halogen substituents in the organic portion of the compound. Thus, the present invention provides bis[1-(dimethoxyphosphinyl)ethyl] o-, m- or p-chlorophenyl phosphite from o-, m- or p-chlorophenyl phosphorodichloridite, acetaldehyde and trimethyl phosphite; bis{α-[bis(2-chloroethoxy)phosphinyl]benzyl} dibromophenyl phosphite from dibromophenyl phosphorodichloridite, benzaldehyde and tris(2-chloroethyl) phosphite; bis[1-(di-n-propoxyphosphinyl)-2-ethylhexyl] 4-(trifluoromethyl)phenyl phosphite from 4-(trifluoromethyl)phenyl phosphorodichloridite, 2-ethylhexanal and tri-n-propyl phosphite; bis[α-(didodecyloxyphosphinyl)benzyl] pentachlorophenyl phosphite from pentachlorophenyl phosphorodichloridite, benzaldehyde and tridodecyl phosphite; bis[1-(di-n-hexyloxyphosphinyl)ethyl] dedachlorobiphenylyl phosphite from decachlorobiphenylyl phosphorodichloridite, acetaldehyde and tris-n-hexyl phosphite; bis[(diethoxyphosphinyl)methyl] 3,4-dichlorobenzyl phosphite from 3,4-dichlorobenzyl phosphorodichloridite, formaldehyde and triethyl phosphite; bis{[bis-(2-chloropropoxy)phosphinyl](α-naphthyl)methyl } 2,5-dibromophenyl phosphite from 2,5-dibromophenyl phosphorodichloridite, α-naphthaldehyde and tris(2-chloropropyl) phosphite; bis[1-(diethoxyphosphinyl)ethyl] α-chloro-β-naphthyl phosphite from α-chloro-β-naphthyl phosphorodichloridite, acetaldehyde and triethyl phosphite; bis[1-(diamyloxyphosphinyl)-2-ethylhexyl] 4-iodophenyl phosphite from 4-iodophenyl phosphorodichloridite, 2-ethylhexanal and triamyl phosphite.

When the dichloro phosphorus reactant is a phosphorodichloridothioite, the presently provided compounds are esters of phosphorothious acid in which the —SH group is esterified with the organic residue of the phosphorodichloridothioite used in the reaction and each of the —OH groups by a (dialkoxyphosphinyl)hydrocarbyl or a [bis(haloalkyl)phosphinyl]hydrocarbyl radical, i.e., they have the structural formula

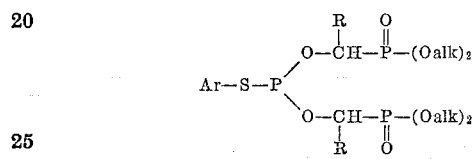

in which Ar designates a benzenoid hydrocarbyl radical which may or may not be halogen-substituted, R designates a hydrogen or hydrocarbyl radical, alk denotes an alkyl radical, and in which both Ar and R are free of olefinic and acetylenic unsaturation. The reaction of phenyl phosphorodichloridothioite, formaldehyde and triethyl phosphite gives bis[(dimethoxyphosphinyl)methyl] S-phenyl phosphorothioite, i.e., a compound of the above formula in which Ar is phenyl, R is hydrogen and Y is methyl; and reaction of 3,4-dichlorophenyl phosphorodichloridothioite, benzaldehyde and tris(2-chloroethyl) phosphite gives bis{α-[bis(2-chloroethoxy)phosphinyl]-benzyl} S-3,4-dichlorophenyl phosphorothioite, i.e., a compound of the above formula in which Ar is 3,4-dichlorophenyl, R is phenyl and Y is 2-chloroethyl. Examples of other presently provided compounds of the above formula are shown in the table below:

| Ar= | R= | Y= |
|---|---|---|
| α-naphthyl | methyl | ethyl |
| 4-biphenylyl | methyl | isopropyl |
| 2-ethylphenyl | n-butyl | methyl |
| p-tolyl | n-hexyl | n-butyl |
| benzyl | phenyl | 2-chloroethyl |
| 2-phenylethyl | ethyl | amyl |
| 3-chlorophenyl | p-tolyl | dodecyl |
| 4-amylbenzyl | 2-ethylpentyl | ethyl |
| 4-bromophenyl | undecyl | methyl |
| n-hexylphenyl | methyl | n-propyl |
| phenyl | n-propyl | n-octyl |
| pentachlorophenyl | methyl | ethyl |
| pentachlorophenyl | phenyl | ethyl |
| pentachlorophenyl | ethyl | 2-chloroethyl |
| decachlorobiphenylyl | ethyl | 2-chloropropyl |
| 4-(trichloromethyl)phenyl | propyl | methyl |
| 2,3,4-trimethylphenyl | ethyl | n-hexyl |
| 4-chloro-3-methylphenyl | phenyl | isodecyl |
| 4-iodophenyl | 4-n-butyl-phenyl | methyl |
| mesityl | α-naphthyl | methyl |

The alkyl or haloalkyl esters of the hydrocarbylphosphonous acids react as do the phosphites with the phosphorodichloridite or the phosphorodichloridothioite and the aldehyde. They give products of the formula

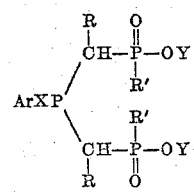

wherein Ar is selected from the class consisting of hydrocarbons and halogen-substituted hydrocarbons which contain an aromatic ring, are free of aliphatic unsaturation and have from 6 to 12 carbon atoms, X is selected from the class consisting of oxygen and sulfur, R is selected from the class consisting of hydrogen and hydrocarbyl radicals which are free of aliphatic unsaturation and which contain from 1 to 11 carbon atoms, R' is a hydrocarbon radical which is free of aliphatic unsaturation and which contains from 1 to 12 carbon atoms, and Y is selected from the class consisting of alkyl and haloalkyl radicals of from 1 to 12 carbon atoms. When the dichloro phosphorus component is an aryl phosphorochloridite, the aldehyde is a hydrocarboncarboxaldehyde, and the phosphonite is a dialkyl hydrocarbylphosphonite, the products are bis[(alkoxyhydrocarbylphosphinyl)hydrocarbyl] aryl phosphites, i.e., they have the general formula

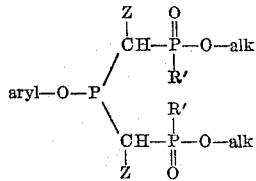

where aryl denotes a hydrocarbon radical which contains an aromatic ring, is free of aliphatic unsaturation and has from 1 to 12 carbon atoms, R' is as above defined and alk denotes an alkyl radical of from 1 to 12 carbon atoms, and Z denotes a hydrocarbyl radical free of aliphatic unsaturation and containing from 1 to 11 carbon atoms. Thus, phenyl phosphorochloridite, propionaldehyde and diethyl butylphosphonite give bis[1-(ethoxybutylphosphinyl)propyl] phenyl phosphite. The ethoxy radical is one of the ester groups of the diethyl butylphosphonite, the butyl radical is derived from said phosphonite as is the phosphinyl portion, the propyl group is derived from the propionaldehyde and the phenyl group is derived from the phenyl phosphorochloridite. Formaldehyde reacts in the same manner, the product having a methyl group instead of the propyl group. The corresponding thioites are obtained analogously from an aryl phosphorochloridothioite, a carboxaldehyde, and a dialkyl hydrocarbylphosphonite, e.g., p-tolyl phosphorochloridothioite, formaldehyde, and dimethyl propylphosphonite yield bis[(methoxypropylphosphinyl)methyl S-p-tolyl thiophosphite of the formula

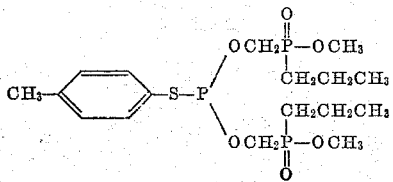

Other compounds which are provided by the invention and the dichloro phosphorus compound, the aldehyde and the phosphonite from which they are prepared are shown below:

Bis[1-(ethoxyphenylphosphinyl)ethyl]α-naphthyl phosphite from α-naphthylphosphorodichloride, acetaldehyde, and diethyl phenylphosphonite.

Bis[α-(butoxyethylphosphinyl)benzyl] 4-ethylphenyl phosphite from 4-ethylphenyl phosphorodichloridite, benzaldehyde, and dibutyl ethylphosphonite.

Bis[1-(dodecyloxycyclohexylphosphinyl)hexyl] 2,4-dichlorophenyl phosphite from 2,4-dichlorophenyl phosphorodichloridite, hexanal, and didodecyl cyclohexylphosphonite.

Bis[1-(methoxy-p-tolylphosphinyl)cyclopentyl] S-ethyl phosphorothioite from ethyl phosphorodichloridothioite, cyclopentanecarboxaldehyde, and dimethyl p-tolylphosphonite.

Bis{[2-chloroethoxy)-1-acenaphthenylphosphinyl]-methyl}biphenylyl phosphite from biphenylyl phosphorodichloridite, formaldehyde and bis(2-chloroethyl) 1-acenaphthenylphosphonate.

Bis{1-[(tetrabromooctyl)benzylphosphinyl]propyl}4-cyclohexylphenyl phosphite from 4-cyclohexylphenyl phosphorodichloridite, propionaldehyde and bis(tetrabromooctyl) benzylphosphonate.

Bis[α-(isopropoxy-α-naphthylphosphinyl)-4-methylbenzyl] 2,2-difluoroethyl phosphite from 2,2-difluoroethyl phosphorodichloridite, p-tolualdehyde and diisopropyl α-naphthylphosphonite.

Bis{1-[(3-iodopropoxy)-4-biphenylylphosphinyl]dodecyl} S-pentachlorophenyl phosphorothioite from pentachlorophenylphosphorodichloridothioite, dodecanal, and bis(3-iodopropyl) 4-biphenylylphosphonite.

Bis[(pentyloxydecylphosphinyl)(β-naphthyl)methyl] 2,4-dimethylcyclohexyl phosphorothioite from 2,4-dimethylcyclohexyl phosphorodichloridothioite, β-naphaldehyde and dipentyl decylphosphorite.

Reaction of the aromatic phosphorodichloridite or phosphorodichloridothioite with the aldehyde and triorgano phosphorus ester is effected by simply mixing the three reactants at ordinary, decreased, or increased temperature and allowing the resulting reaction mixture to stand until formation of the phosphinyl phosphite or phosphorothioite. Thus, the phosphorus ester may be mixed with the dichloro phosphorus compound and the aldehyde added to the resulting mixture, or the aldehyde and the ester may first be mixed and the dichloro phosphorus compound added thereto. Because the reaction is usually exothermic, gradual contact of the reactants is generally recommended in order to obtain smooth reaction. However, as will be apparent to those skilled in the art, the exothermal nature of the reaction becomes less of a factor as the molecular weight of the reactants, and particularly of the phosphorus ester is increased. Also, when the aldehyde is either a higher alkanecarboxaldehyde or aliphatic-aromatic aldehyde having a high aliphatic content, reaction is generally not as rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or the quantity of by-product alkyl or haloalkyl halide. Reaction of the three components takes place readily in the absence of an inert diluent or catalyst. However, catalysts and diluents or solvents may be employed. The use of diluents may be particularly advantageous when working with the more reactive aldehydes; such diluents may be, e.g., benzene, toluene, dioxane, methylene chloride or hexane. When employing no diluent and using substantially the stoichiometric proportion of reactants, i.e., one molar equivalent of the dichlorophosphorus compound, substantially two molar equivalents of the aldehyde and substantially two molar equivalents of the phosphite or phosphonite, the reaction product may be used directly for a variety of industrial and agricultural purposes without purification, i.e., it consists essentially of the diphosphinyl phosphite or phosphorothioite dissolved in the alkyl chloride or alkylene dichloride which is produced as by-product. If desired, however, the diphosphinyl phosphite or phosphorothioite may be readily separated from said by-product by volatilizing off the latter to give the diphosphinyl compound as residue. If an excess of any one of the three reactants is initially present, such an excess may also be separated from the product by distillation. While, as will be appreciated by those skilled in the art, the stoichiometric proportions, i.e., one mole of the dichloro phosphorus compound and two moles each of the aldehyde and triorgano phosphorus ester are advantageously employed in that thereby good yields of desired product result and there arises substantially no problem of separating any excess reactant or reactants, the three reactants may be present in the initial reaction mixture in any proportion.

The compounds provided by the invention are stable, generally high-boiling compositions which range from viscous liquids to waxy and crystalline products. They may be advantageously used for a wide variety of industrial and agricultural purposes, e.g., as fungicides, insecticides and bacteriostats; as plasticizers for synthetic resins and plastics; and as functional fluids in electrical and force-transmission applications. The presently provided diphosphinyl phosphorothioites find application as rubber-compounding chemicals and as lubricant additives. The diphosphinyl phosphites are valuable as flame-proofing agents for cellulosic and carbonaceous materials, generally. They are especially useful as additives to gasoline and other hydrocarbon fuels containing organo-lead compounds. The present diphosphinyl phosphites serve as lead scavengers and glow-suppressing agents when incorporated into leaded gasolines.

The invention is further illustrated by, but not limited to, the following examples:

*Example 1*

To a mixture consisting of 30.9 g. (0.70 mole) of acetaldehyde and 181.9 g. (0.675 mole) of tris(2-chloroethyl)phosphite, there was added, during 20 minutes at a temperature of 10–20° C., 62.4 g. (0.32 mole) of phenyl phosphorodichloridite. When all of the chloridite had been added, the reaction mixture was stirred, with ice-cooling, for 15 minutes and then at room temperature for another 15 minutes. It was then heated to 70° C. in order to insure complete reaction, placed under water-pump vacuum, and heated to 105° C. to remove by-product 1,2-dichloroethane and any unreacted material. Concentration to 120° C./1.0 mm., gave as residue 219 g. of the substantially pure bis{1-[bis(2-chloroethoxy)phosphinyl]ethyl} phenyl phosphite, $n_D^{25}$ 1.5067, analyzing 34.02% carbon and 4.87% hydrogen as against 34.69% and 4.69%, the calculated values, and having the structure

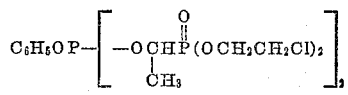

*Example 2*

Acetaldehyde (26.4 g., 0.6 mole) was added to 62.0 g. (0.5 mole) of trimethyl phosphite in an ice-cooled flask. To the resulting mixture there was then added 49.1 g. (0.2 mole) of p-chlorophenyl phosphorodichloridothioite during about 10 minutes while maintaining the temperature at 5–10° C. When external cooling was discontinued, the temperature rose spontaneously to 47° C. The addition of 5 g. more of the acetaldehyde caused no further heat of reaction. Accordingly, the colorless reaction mixture was warmed to 70° C. and concentrated to 98° C./0.5 mm., to give as residue 90.1 g. (94% theoretical yield) of the substantially pure bis[1-(dimethoxyphosphinyl)ethyl] S-p-chlorophenyl phosphorothioite, $n_D^{25}$ 1.5451, and having the structure

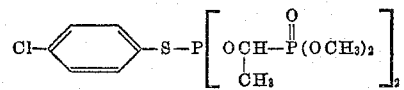

*Example 3*

To a 500 ml. flask there was added 19.8 g. (0.1 mole) of diethyl phenylphosphonite and 5.8 g. (0.1 mole) of propionaldehyde. Then 9.8 g. (0.05 mole) of phenyl phosphorodichloridite was added dropwise in five minutes while cooling at 25–30° C. When the addition was completed, the mixture was heated to 130° C. to insure complete reaction. Concentration to 150° C. at reduced pressure gave as residue bis[1-(ethoxyphenylphosphinyl)propyl] phenyl phosphite,

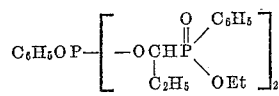

This application is a continuation-in-part of my copending application Serial No. 780,222, filed December 15, 1958, now abandoned.

What I claim is:
1. A compound of the formula

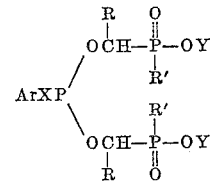

in which Ar is selected from the class consisting of hydrocarbon and halogen-substituted hydrocarbon radicals which contain an aromatic ring, are free of aliphatic unsaturation and have from 6 to 12 carbon atoms, X is selected from the class consisting of oxygen and sulfur, R is selected from the class consisting of hydrogen and hydrocarbon radicals which are free of aliphatic unsaturation and which contain from 1 to 11 carbon atoms, Y is selected from the class consisting of alkyl and haloalkyl radicals of from 1 to 12 carbon atoms, and R' is selected from the class consisting of —OY and hydrocarbon radicals which are free of aliphatic unsaturation and contain from 1 to 12 carbon atoms.

2. A compound of the formula

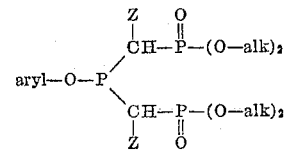

in which aryl denotes a hydrocarbon radical which contains an aromatic ring, is free of aliphatic unsaturation, and has from 6 to 12 carbon atoms, Z is a hydrocarbon radical which is free of aliphatic unsaturation and which contains from 1 to 12 carbon atoms and alk denotes an alkyl radical of from 1 to 12 carbon atoms.

3. A compound of the formula

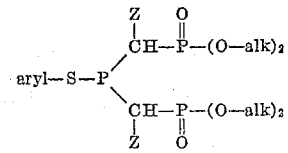

in which aryl denotes a hydrocarbon radical which contains an aromatic ring, is free of aliphatic unsaturation, and has from 6 to 12 carbon atoms, Z is a hydrocarbon radical which is free of aliphatic unsaturation and which contains from 1 to 12 carbon atoms and alk denotes an alkyl radical of from 1 to 12 carbon atoms.

4. A compound of the formula

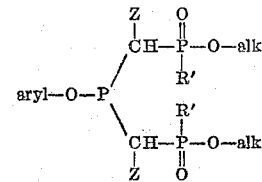

where aryl denotes a hydrocarbon radical which contains an aromatic ring, is free of aliphatic unsaturation and has from 6 to 12 carbon atoms, R' is as above defined, and alk denotes an alkyl radical of from 1 to 12 carbon atoms, and Z denotes a hydrocarbyl radical free of aliphatic unsaturation and containing from 1 to 11 carbon atoms.

5. A bis[1-(dialkoxyphosphinyl)alkyl] aryl phosphite wherein the aryl radical has from 6 to 12 carbon atoms and the alkoxy and alkyl radicals each have from 1 to 12 carbon atoms.

6. A bis[α-(dialkoxyphosphinyl)aralkyl] aryl phosphite wherein each alkoxy radical has from 1 to 12 carbon atoms, the aralkyl radical has from 7 to 12 carbon atoms and the aryl radical has from 6 to 12 carbon atoms.

7. A bis[1-(dialkoxyphosphinyl)alkyl] haloaryl phosphite wherein the alkoxy and alkyl radicals each have from 1 to 12 carbon atoms and the haloaryl radical has from 6 to 12 carbon atoms.

8. A bis{1-[bis(haloalkoxy)phosphinyl]alkyl} aryl phosphite wherein the haloalkoxy and alkyl radicals each have from 1 to 12 carbon atoms and the aryl radical has from 6 to 12 carbon atoms.

9. A bis[1-(dialkoxyphosphinyl)alkyl] S-aryl phosphorothioite wherein the alkoxy and alkyl radicals each have from 1 to 12 carbon atoms and the aryl radical has from 6 to 12 carbon atoms.

10. Bis{1-[bis(2-chloroethoxy)phosphinyl]ethyl} phenyl phosphite.

11. Bis[1 - (dimethoxyphosphinyl)ethyl] S - p - chlorophenyl phosphorothioite.

12. Bis[1 - (ethoxyphenylphosphinyl)propyl] phenyl phosphite.

References Cited in the file of this patent

Abramov: J. Gen. Chemistry, U.S.S.R., 22, 709–713 (1952) (English translation).

Alimovet et al.: Bull. Acad. Sci., U.S.S.R., Div. of Chem. Sci., 1955, 929–934 (English translation).